Oct. 13, 1959     T. R. SWENSON     2,908,180
GEAR MECHANISM
Original Filed Sept. 10, 1954
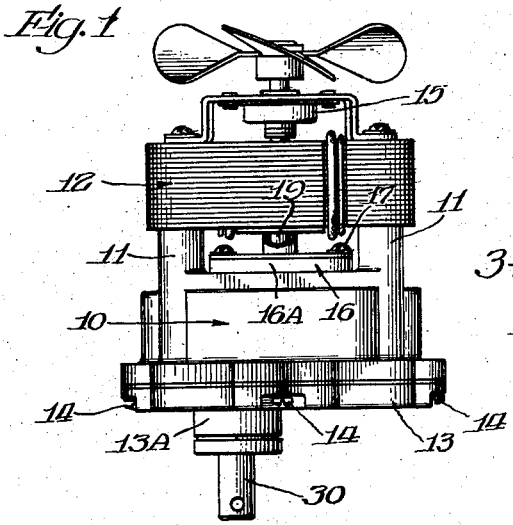
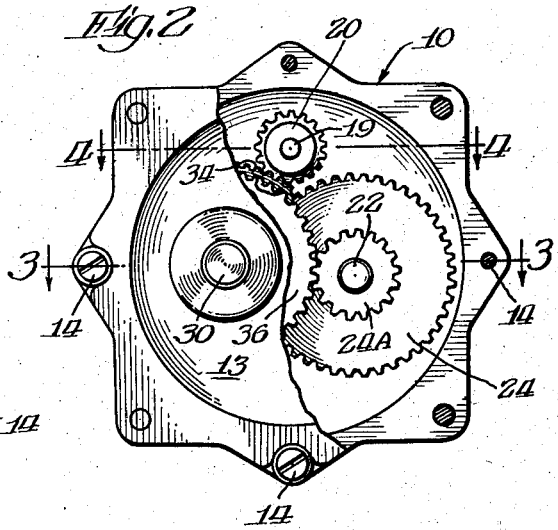
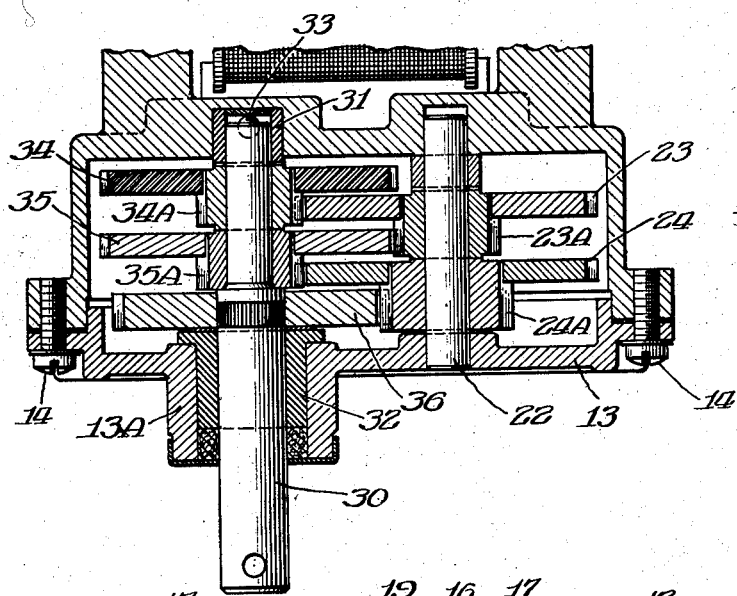
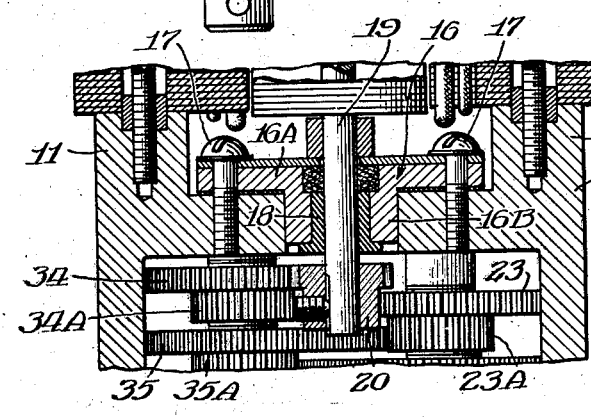
Inventor:
Thure R. Swenson UnitedStates Patent Office  2,908,180
Patented Oct. 13, 1959

2,908,180

GEAR MECHANISM

Thure R. Swenson, Evanston, Ill., assignor to Raymond T. Moloney, Chicago, Ill.; American National Bank and Trust Company of Chicago, executor of said Raymond T. Moloney, deceased Substitute for abandoned application Serial No. 455,113, September 10, 1954. This application May 4, 1956, Serial No. 582,847

3 Claims. (Cl. 74—421)

This disclosure provides an improved reduction gear system which is particularly suited for use in fractional horsepower motors, one of the principal features being the simplification of the housing gear box castings and elimination of studs, bosses, bearing seats, and like formations, heretofore necessary in such castings to seat the various gears involved, this application being substituted for application Serial No. 455,113, filed September 10, 1954, now abandoned.

A further object is the provision of a more efficient, and at the same time less costly, gear unit by mounting a plurality of gears on one shaft with the elimination of expensive, space-consuming, and structure-weakening stud, boss, and other bearing formations or seats in the gear box, and the consequent possibility of employing heavier gears in the enlarged space thus made available.

Additional advantages attending the improved gear system and housing structure are a decrease in structural failures in both the gearing and housing, greater ease of assembly, disassembly and servicing access to the gears; a quieter moving system; and a wider overload margin.

Additional objects and aspects of novelty and utility relate to details of the construction and operation of the device described hereinafter in view of the annexed drawing, in which:

Fig. 1 is a top plan view of the reduction gear and attached motor;

Fig. 2 is a front elevation of the same with part of the cover plate broken away;

Fig. 3 is a fragmentary sectional detail taken along lines 3—3 of Fig. 2 in the gear housing;

Fig. 4 is another fragmentary sectional detail along lines 4—4 of Fig. 2 at the motor shaft.

The combination motor and reduction gear unit depicted in Fig. 1 includes a gear box or housing 10 in the form of a die-casting having bosses 11 for mounting of a small induction motor 12, and a front cover plate 13 removably secured by screws 14.

The motor 12 is of conventional design except that the front bearing 16 (Fig. 4, also) is not carried by the motor, as is the rear bearing 15, but instead consists of a casting 16A held on the housing by screws 17 with a nipple 16B fitting into a bore in the housing and an insert sleeve bearing 18 fitted into the bore of the nipple.

Thus, the input power shaft 19 of the motor is aligned for coaction with the gear system.

As seen in Fig. 2, there are only three shafts or gear axes involved in the simplified gear system, one being the power or input shaft 19, a second being the stub shaft 22 (Fig. 3 also), and the third and last being the output or load shaft 30.

As seen in Fig. 3, the output shaft 30 is mounted for rotation in an inner insert bearing 31 in the housing, and a larger sleeve bearing 32 pressed into a seat 13A formed as part of the cover plate. A thrust ball bearing 33 is provided at the inner end of shaft 30.

All but one of the reduction gears on the power output shaft 30 are floating free thereon, while all of the gears on the stub shaft float freely thereon, there being only a small driving pinion 20 (Fig. 2) fixed on the motor drive shaft 19 in position to mesh with a fibre or like non-metallic gear 34 floating on shaft 30 (as in Figs. 2, 3, and 4).

The driven fibre gear 34 has affixed to it a pinion 34A (Figs. 3 and 4) meshing with driven gear 23 floating on the stub shaft 22, said gear 23 likewise having a pinion 23A secured to it and driving a gear 35 which floats on the power output shaft.

The driven floating gear 35 has a pinion 35A affixed thereto and driving a floating gear 24 on the stub shaft, which gear likewise has a fixed pinion 24A driving a fixed and final gear 36 press-fitted onto shaft 30 to turn the latter at the desired output speed determined by the ratios of the train of intermediate floating gears 23 . . . 24A and 34 . . . 35A.

Heretofore gear reduction units for fractional horsepower motors have employed stub and pin shafts in necessary numbers and locations in the gear box with a resultant crowding of the components, difficulty in assembly or in gaining access to parts for servicing, and a costly necessity for fitting the stub shaft into seats or pressing home the pin shafts or bearings or providing for inserts in the mold for the box.

The present disclosures therefore afford a compact, less expensive, more rugged and efficient reduction gear characterized by the provision of a stationary stub shaft and a rotatable work shaft with a train of intermeshing reduction gears floating free on both shafts to drive a final fixed output gear on the power shaft in the last stage from power received from a motor pinion driving a floating gear on the power shaft in the first or input stage.

The respective tandem sets of primary and secondary gears on these two shafts (e.g. 34—35—36 on 30 and 23—24 on 22) turn in the same direction on their respective shafts and tend to equalize and reduce wear, which generally occurs on only one side of the shafting in the old-style gear-train system. If required, the stub shaft 22 can be made revolvable to carry this equalization even farther, although for most applications it is sufficient to have only the power shaft revolve.

Size for size, with respect to overall bulk, the new motor and more particularly its reduction gear system is considerably more powerful and rugged than the older types, and will consistently handle loads ordinarily calling for larger and much more expensive motors of the old type, including some which employ worm gears.

I claim:

1. In a motor and gear mechanism a housing having a backwall, a surrounding sidewall structure defining a cavity open on its side opposite said backwall, the latter having a bore therethrough into said cavity; a motor bearing removably mounted on the backwall for alignment with said bore, a motor having a rotor shaft mounted on said backwall with said shaft supported by said bearing to enter said cavity and having a drive pinion disposed in the cavity; said motor having a second motor bearing also supporting said rotor shaft cooperatively with the first motor bearing; a cover plate for said cavity, a pair of parallel shafts in the cavity and seated at their respectively opposite end portions in means on said backwall and cover plate, one of said shafts constituting an output shaft and having a final driven gear fast thereon; gear means floating free on both of said shafts and cooperatively forming a gear train, a first floating gear of which meshes with said drive pinion and a last gear of which meshes with said driven output gear, said drive pinion being eccentric relative to said parallel shafts, 2. In a gear mechanism, a housing, a motor carried by the housing and having a drive shaft supported near one end by bearing means on the motor and near an opposite end by bearing means carried by said housing, said latter end entering the housing and having a driving pinion thereon; a power output shaft in the housing and having a final driven gear fast thereon and also free gears floating thereon; an intermediate stub shaft in the housing and having free floating gears thereon intermeshing with the free gears on the power shaft to define a gear train finally driving said final gear on the power shaft, said motor driving pinion having driving intermesh with a first one of said free gears of the train, and turning on an axis eccentric of the axes of the other two shafts.

3. A combination motor and gear mechanism comprising a motor having a stator assembly and a rotor and rotor shaft, together with a cooperative change-ratio gear mechanism including a housing comprising a shell open at one side opposite a bottom wall and a cover for said open side; means on said bottom wall, located eccentrically of a major central axis between said bottom wall and cover plate, providing a through-bearing supporting said rotor shaft at one side of the rotor for entry into said housing; means located of said bottom wall supportably engaged by said stator assembly with said rotor shaft aligned with said through-bearing; means providing a second bearing for the rotor shaft at the distal side of the stator assembly from said bottom wall and the through-bearing, said through-bearing and second bearing constituting the sole journal means for the rotor; a stub shaft and a load shaft supported with portions disposed interiorly of the housing by said bottom wall and cover and both eccentric of said major axis, said load shaft having an output gear fixed thereon driven from a floating stub shaft gear and then projecting through the cover for coupling with a load; and a train of cooperative change-ratio gears within the housing and variously distributed on said stub and load shafts, all of the gears on the stub shaft floating thereon and some of the gears on the load shaft floating thereon including a floating input gear, said train being driven by pinion means on the rotor shaft meshing with said floating input gear.

References Cited in the file of this patent

UNITED STATES PATENTS

| | | |
|---|---|---|
| 535,643 | Thomson | Mar. 12, 1895 |
| 642,765 | Thomson | Feb. 6, 1900 |
| 2,076,015 | Broome | Apr. 6, 1937 |

FOREIGN PATENTS

| | | |
|---|---|---|
| 736,716 | France | Nov. 28, 1932 |

UNITED STATES PATENT OFFICE

CERTIFICATE OF CORRECTION

Patent No. 2,908,180                                                           October 13, 1959

Thure R. Swenson

It is hereby certified that error appears in the printed specification of the above numbered patent requiring correction and that the said Letters Patent should read as corrected below.

Column 3, line 24, for "located of said" read -- located on said --.

Signed and sealed this 10th day of May 1960.

(SEAL)
Attest:

KARL H. AXLINE                                          ROBERT C. WATSON
Attesting Officer                                Commissioner of Patents